US011138141B1

(12) United States Patent
Sendelbach

(10) Patent No.: US 11,138,141 B1
(45) Date of Patent: Oct. 5, 2021

(54) SYSTEM TO ENABLE DISPLAY DETECT AND METHOD THEREFOR

(71) Applicant: DELL PRODUCTS, LP, Round Rock, TX (US)

(72) Inventor: Eric Sendelbach, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/861,021

(22) Filed: Apr. 28, 2020

(51) Int. Cl.
*G06F 13/40* (2006.01)
*G06T 1/20* (2006.01)

(52) U.S. Cl.
CPC ........... *G06F 13/4081* (2013.01); *G06T 1/20* (2013.01)

(58) Field of Classification Search
CPC ............................. G06F 13/4081; G06T 1/20
See application file for complete search history.

(56) References Cited

U.S. PATENT DOCUMENTS

| 7,565,457 | B2 * | 7/2009 | Ooi .................... G06F 13/4081 710/15 |
| 8,456,456 | B2 | 6/2013 | Huang et al. |
| 10,275,370 | B2 | 4/2019 | Perez et al. |
| 10,452,602 | B2 * | 10/2019 | Hu ........................ G06F 13/385 |

* cited by examiner

*Primary Examiner* — Henry Tsai
*Assistant Examiner* — John B Roche
(74) *Attorney, Agent, or Firm* — Larson Newman, LLP

(57) ABSTRACT

A method may include executing basic input/output system (BIOS) instructions to initialize an information handling system. The initialization may include generating a hot-plug detect (HPD) override request. The method may further include receiving the HPD override request at a general purpose input/output (GPIO) device. In response to receiving the HPD override request, the GPIO may assert an active-low signal at an interconnect electrically connected to a HPD terminal of a graphics display receptacle, the receptacle for coupling a graphics processing unit to a graphics display device.

20 Claims, 3 Drawing Sheets

SYSTEM TO ENABLE DISPLAY DETECT AND METHOD THEREFOR

FIELD OF THE DISCLOSURE

This disclosure generally relates to information handling systems, and more particularly relates to enabling display detect at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include executing basic input/output system (BIOS) instructions to initialize an information handling system. The initialization may include generating a hot-plug detect (HPD) override request. The method may further include receiving the HPD override request at a general purpose input/output (GPIO) device. In response to receiving the HPD override request, the GPIO may assert an active-low signal at an interconnect electrically connected to an HPD terminal of a graphics display receptacle, the receptacle for coupling a graphics processing unit to a graphics display device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
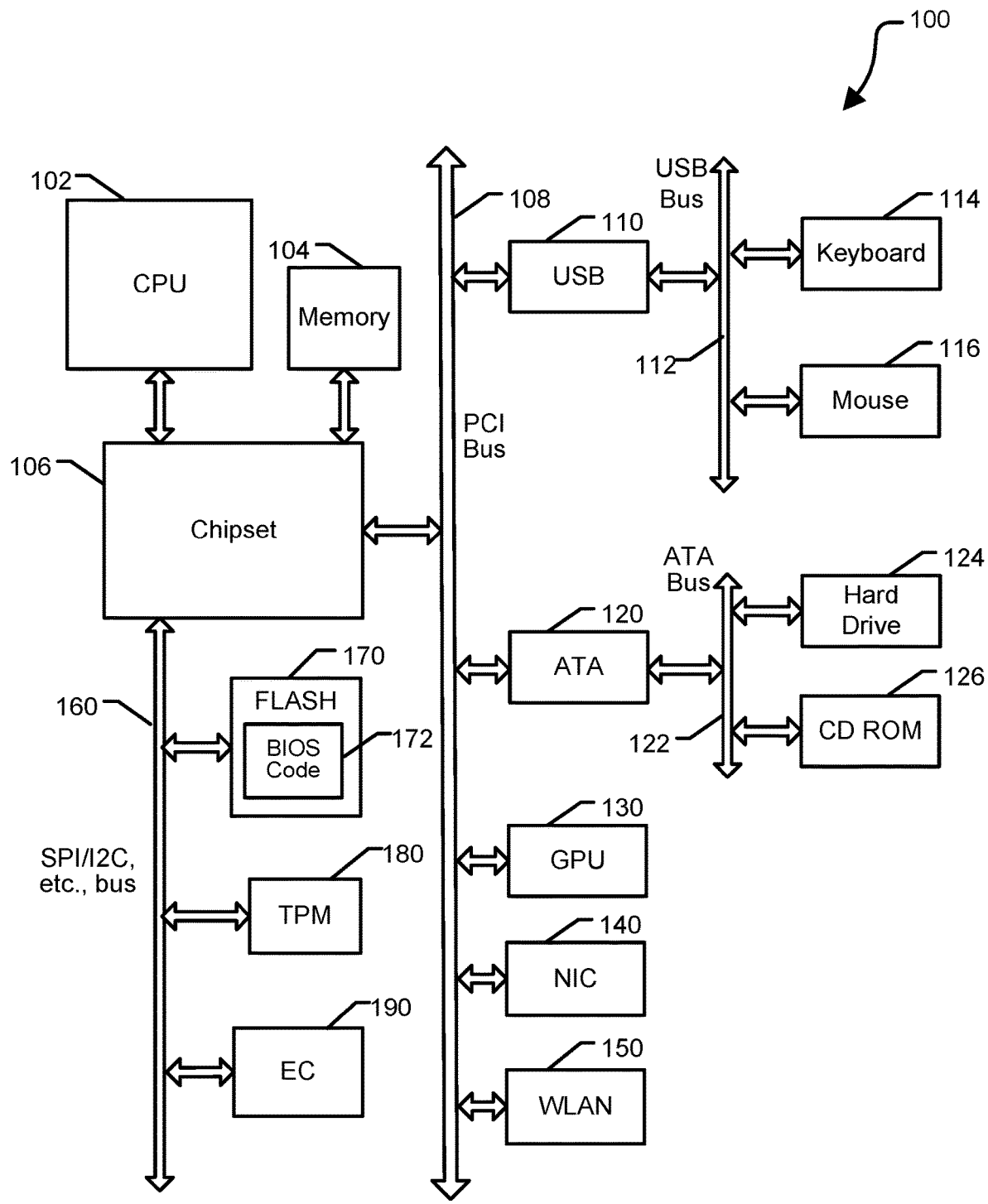
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an ATA bus controller 120, an ATA bus 122, a data storage device 124, a compact disk read only memory (CD ROM) device 126, a graphics processing unit (GPU) 130, a network interface controller (NIC) 140, a wireless local area network (WLAN) controller 150, one or more serial busses 160, a non-volatile rand access memory (NVRAM) 170 for storing a basic input/output system (BIOS) 172, a trusted platform module (TPM) 180, and an embedded controller (EC) 190.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an inter-integrated circuit protocol (I2C) bus, a system management bus (SMB), a power management bus (PMBus), and the like.

Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, that is a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system is loaded, such as Windows, computational operation of information handling system can begin. In an embodiment, the BIOS 172 can be substantially compliant with one or more revisions of the UEFI specification.

Information handling systems may be configured to operate without an attached graphic display device. Examples of such systems include servers, automation controllers, network accessible data storage devices, and the like. In addition, an information handling system may utilize a USB interface to couple the system to a display device instead of a provided graphics display receptacle. For another example, an original equipment manufacturer (OEM) may prefer to perform product testing and configuration operations during manufacture of an information handling system without an attached display device. However, under some circumstances an information handling system may fail to complete BIOS initialization or fail to properly complete initialization of an operating system if a graphics display device is not detected.

Figure 2:
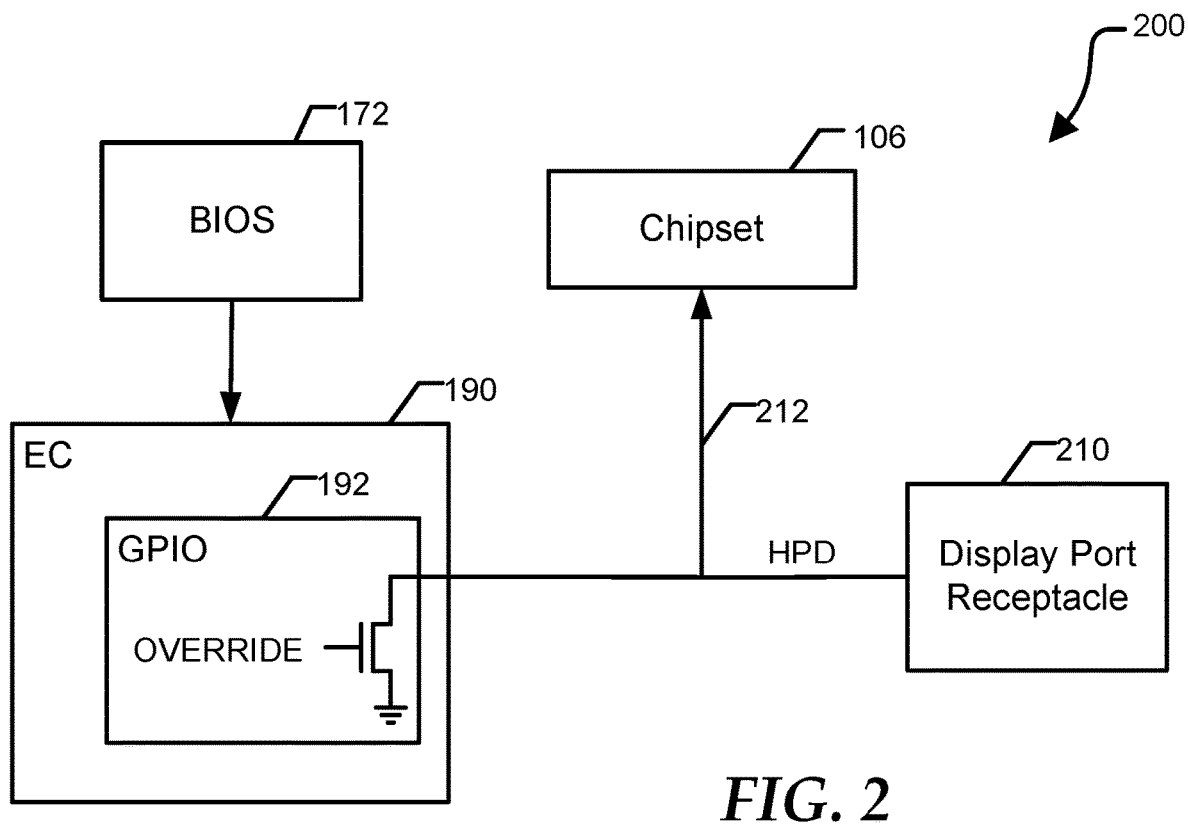
FIG. 2 is a block diagram illustrating graphics display circuitry at an information handling system according to a specific embodiment of the present disclosure.
Figure 3:
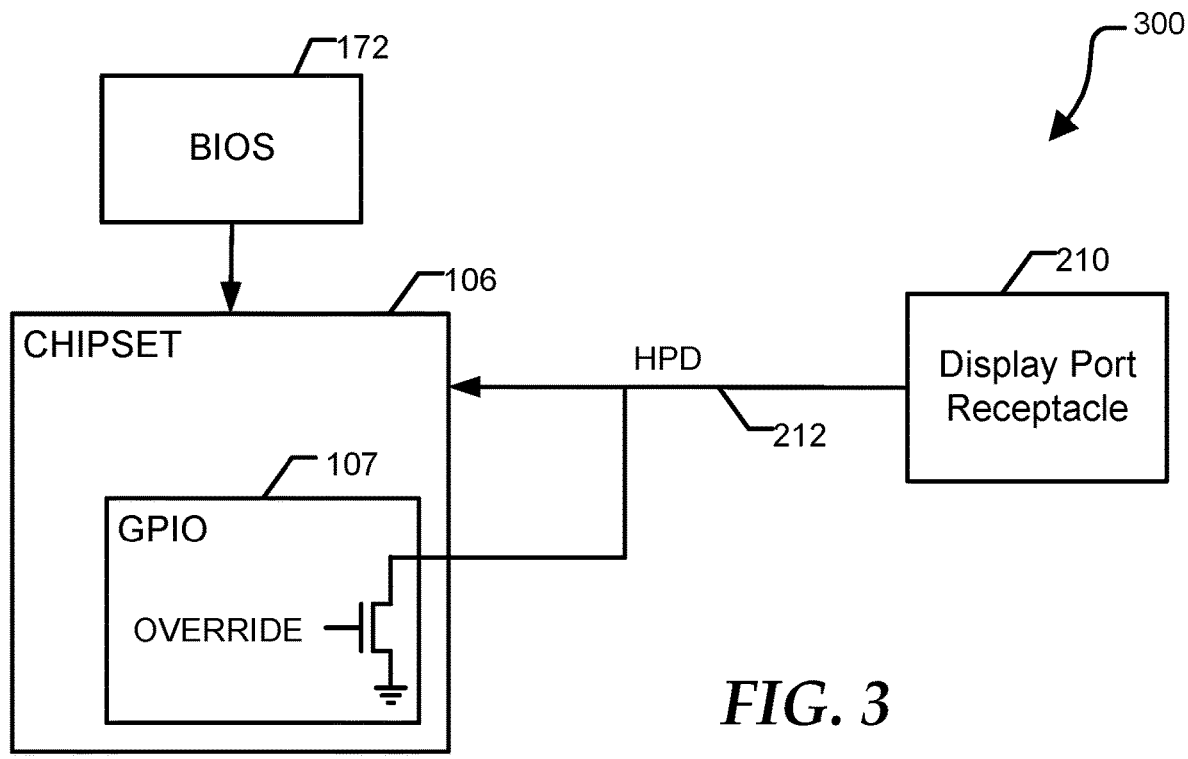
FIG. 3 is a block diagram illustrating graphics display circuitry at an information handling system according to another embodiment of the present disclosure.
Figure 4:
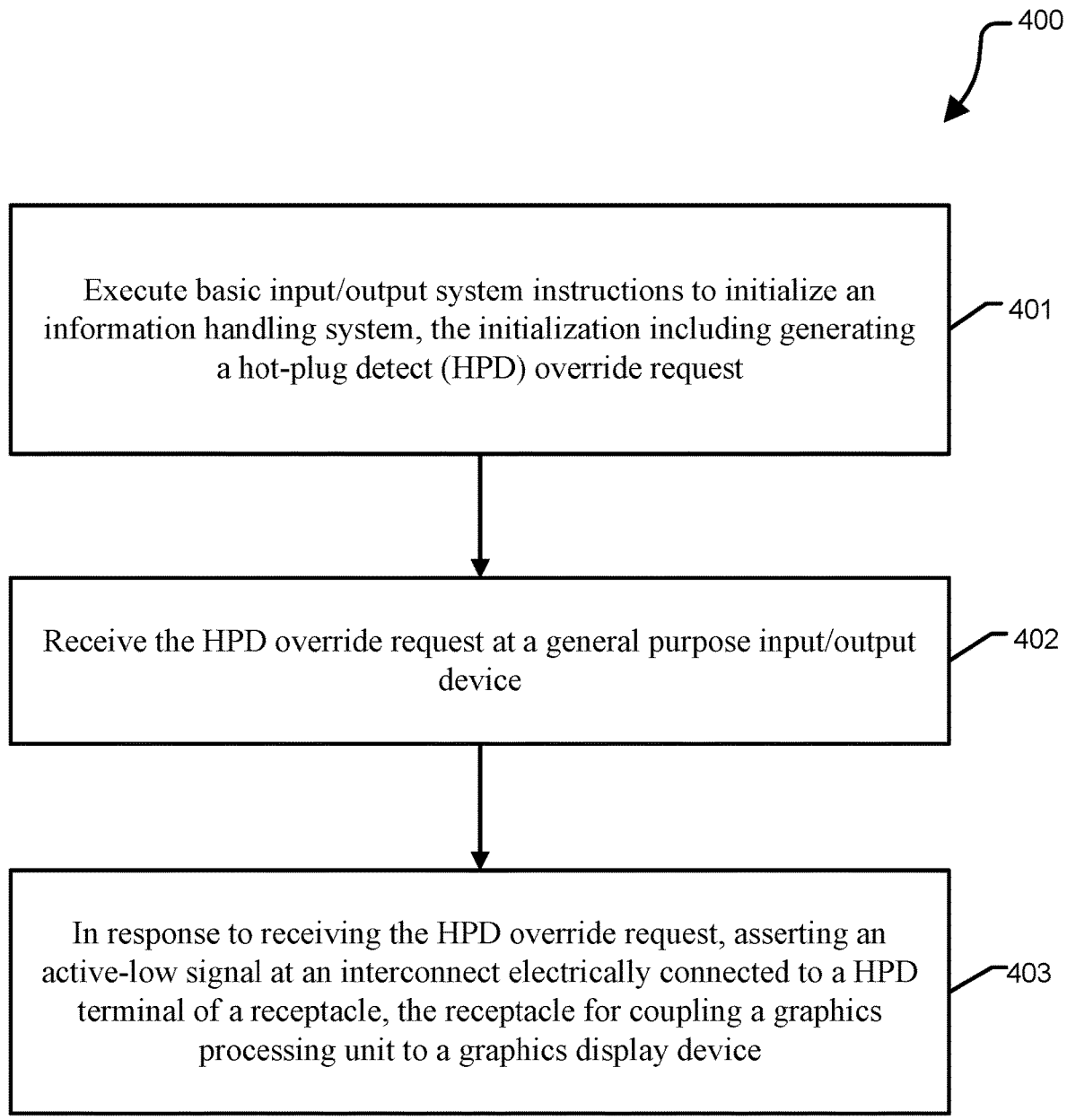
FIG. 4 is a flow diagram illustrating a method for providing a hot-plug detect override signal according to a specific embodiment of the present disclosure.

The Display Port (DP) and High-Definition Multimedia Interface (HDMI) video specifications define a terminal included at a display receptacle to receive a hot-plug detect (HPD) signal generated by an attached graphics display device. In particular, the display device typically includes circuitry to drive an HPD terminal of the receptacle to logic-low level, such as a ground reference voltage. When the display device is plugged into the receptacle, the HPD signal received within the information handling system is asserted (logic-low), and a boot process can continue normally. However, if a display device is not plugged into the receptacle, the HPD signal may remain at a logic-high level, and the boot process may not complete. During manufacturing, an OEM may insert a dongle or a similar device into the system's display receptacle that asserts the HPD signal, but doing so may be inefficient or problematic. For example, an information handling system may be shipped to a customer with the dongle inadvertently still attached to the display receptacle. FIGS. 2-4 show techniques for asserting a logic-low level at the HPD signal interconnect within an information handling system so that system processes are fooled into determining that a display device is attached, even when a display device is not plugged into a corresponding display receptacle.

FIG. 2 shows graphics display circuitry 200 at an information handling system according to a specific embodiment of the present disclosure. Display circuitry 200 includes BIOS 172, chipset 106, EC 190, and a Display Port receptacle 210. EC 190 includes a general purpose input/output (GPIO) device 192. GPIO device 192 includes an output that is electrically connected to an interconnect 212 that couples a hot-plug detect signal HPD from a corresponding terminal of receptacle 210 to chipset 106. If a display device is plugged into receptacle 210, the display device can provide a logic-low signal that is propagated from receptacle 210 to chipset 106 via interconnect 212. As disclosed herein, GPIO device 192 can be configured to drive HPD interconnect 212 to a logic-low level even when there is not a display device plugged into receptacle 210.

During initialization of information handling system 100, CPU 102 executes instructions included at BIOS 172, as described above. The initialization process can be described as a sequence of stages, including a Security Phase (SEC), Pre-EFI Initialization (PEI), a Driver Execution Environment (DXE), and a Boot Device Select (BDS) stage. Initialization completes by loading an operating system that substantially takes over control of information handling system 100, referred to as the runtime environment, or simply runtime. In an embodiment, BIOS 172 can be configured to issue a request to EC 190 during the DXE phase of initialization, the request for GPIO 192 to generate a logic-low signal at HPD interconnect 212. At a later time, BIOS or another process can configure GPIO 192 to discontinue asserting the logic-low signal at HPD interconnect 212. In one embodiment, the assertion of HPD can be discontinued during BIOS initialization, such as later in the DXE phase. In another embodiment, the assertion of HPD can be discontinued during runtime. The BIOS request to EC 190 can be communicated using a firmware mailbox at EC 190, such as via an Enhanced Serial Peripheral Interface (eSPI) bus provided by chipset 106.

While display circuitry 200 illustrates information handling system receiving the HPD signal at chipset 106, one of skill will appreciate that another subsystem may be responsible for monitoring the HPD signal. For example, some or all of the functionality provided by chipset 106 can be included at CPU 102, in which case HPD interconnect 212 can be electrically connected to CPU 102. For simplicity, FIG. 2 does not show other signal interconnects associated with receptacle 210 and GPU 130, such as a graphics data main link, an auxiliary channel, power, and the like. Furthermore, while display circuitry 200 is described in the context of a Display Port receptacle, the disclosed techniques are applicable to graphics systems that utilize an HDMI interface, or any other graphics specification that supports an HPD protocol.

FIG. 3 is a block diagram illustrating graphics display circuitry 300 at an information handling system according to another embodiment of the present disclosure. Display circuitry 300 includes BIOS 172, chipset 106, EC 190, and a Display Port receptacle 210. Chipset 106 includes a GPIO device 107. GPIO device 107 includes an output that is electrically connected to an interconnect 212 that couples a hot-plug detect signal HPD from a corresponding terminal of receptacle 210 to chipset 106. Operation of graphics display circuitry 300 is similar to that described above with regard to circuitry 200 of FIG. 2. In particular, BIOS 172 can issue a request to GPIO 107 to assert a logic-low signal at HPD interconnect 212, even when a display device is not attached to receptacle 210. One of skill will appreciate that another GPIO included at information handling system that can be controlled in the described manner by BIOS 172.

FIG. 4 is a flow diagram illustrating a method for providing a hot-plug detect override signal according to a specific embodiment of the present disclosure. Method 400 begins at block 401 where BIOS instructions are executed to initialize an information handling system, the initialization including generating a hot-plug detect (HPD) override request. For example, BIOS 172 can send an HPD override request to GPIO 192 at EC 190, GPIO 107 at chipset 106, or another GPIO device included at information handling system 100. The request can be communicated to the GPIO device using any suitable method, such as via a memory mapped register, a mailbox protocol, and the like. The method continues at block 402 where the HPD override request is received at a general purpose input/output device. Method 400 completes at block 403 where, in response to receiving the HPD override request, the GPIO asserts an active-low signal at an interconnect electrically connected to an HPD terminal of a receptacle, the receptacle for coupling a graphics processing unit to a graphics display device. For example, FIGS. 2 and 3 show how a GPIO can drive HPD interconnect 212 to a ground reference voltage level, thereby asserting signal HPD even when a display device is not attached to receptacle 210.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display receptacle to couple the information handling system to a graphics display device, the receptacle including a hot-plug detect (HPD) terminal configured to receive an HPD signal from the graphics display device;
   a general purpose input/output (GPIO) device, an output of the GPIO device electrically coupled to the HPD terminal; and
   a central processing unit (CPU) to execute basic input/output system (BIOS) instructions, the BIOS instructions to configure the GPIO to assert an active-low signal at an interconnect electrically connected to the HPD terminal.

2. The information handling system of claim 1, further comprising an embedded controller (EC), and wherein the GPIO is included at the EC.

3. The information handling system of claim 1, further comprising a chipset functionally coupled to the CPU, and wherein the GPIO is included at the chipset.

4. The information handling system of claim 1, further comprising an integrated graphics processing unit (GPU), the integrated GPU coupled to the display receptacle.

5. The information handling system of claim 1, further comprising a BIOS configuration setup interface, the interface including an option to enable and disable configuring the GPIO to assert the active-low signal.

6. The information handling system of claim 1, wherein the display receptacle is a Display Port receptacle.

7. The information handling system of claim 1, wherein the display receptacle is a High-Definition Multimedia Interface receptacle.

8. The information handling system of claim 1, wherein the GPIO is configured to discontinue the assertion of the active-low signal prior to handing control of the information handling system to an operating system.

9. The information handling system of claim 1, wherein the GPIO is configured to discontinue the assertion of the active-low signal after the BIOS transfers control of the information handling system to an operating system.

10. A method comprising:
    executing basic input/output system (BIOS) instructions to initialize an information handling system, the initialization including generating a hot-plug detect (HPD) override request;
    receiving the HPD override request at a general purpose input/output (GPIO) device; and
    in response to receiving the HPD override request, asserting an active-low signal at an interconnect electrically connected to an HPD terminal of a graphics display receptacle, the receptacle for coupling a graphics processing unit to a graphics display device.

11. The method of claim 10, wherein the GPIO is included at an embedded controller.

12. The method of claim 10, wherein the GPIO is included at a chipset.

13. The method of claim 10, wherein the display receptacle is coupled to an integrated graphics processing unit included at the information handling system.

14. The method of claim 10, wherein the information handling system provides a BIOS configuration setup interface, the interface including an option to enable and disable configuring the GPIO to assert the active-low signal.

15. The method of claim 10, wherein the GPIO is configured to discontinue the assertion of the active-low signal prior to handing control of the information handling system to an operating system.

16. The method of claim 10, wherein the GPIO is configured to discontinue the assertion of the active-low signal after the BIOS transfers control of the information handling system to an operating system.

17. A circuit board comprising:
    a graphics processing unit (GPU);
    a display receptacle to couple the GPU to a graphics display device, the receptacle including a hot-plug detect (HPD) terminal configured to receive an HPD signal from the graphics display device;
    a general purpose input/output (GPIO) device, an output of the GPIO device electrically coupled to the HPD terminal; and
    a central processing unit to execute basic input/output system (BIOS) instructions, the BIOS instructions to configure the GPIO to assert an active-low signal at an interconnect electrically connected to the HPD terminal.

18. The circuit board of claim 17, further comprising an embedded controller (EC), wherein the GPIO is included at the EC.

19. The circuit board of claim 17, further comprising a chipset functionally coupled to a central processing unit, wherein the GPIO is included at the chipset.

20. The circuit board of claim 17, wherein the GPU is an integrated GPU permanently installed at the circuit board.

* * * * *